United States Patent [19]

French et al.

[11] 4,349,278
[45] Sep. 14, 1982

[54] COMPARATOR MASK FOR APERTURE MEASURING APPARATUS

[75] Inventors: Kenneth French, Merrimack, N.H.; Alfred Piorkow, Lancaster, S.C.

[73] Assignee: GTE Products Corporation, Stamford, Conn.

[21] Appl. No.: 158,024

[22] Filed: Jun. 9, 1980

[51] Int. Cl.³ .................. G01B 11/02; G01B 3/34
[52] U.S. Cl. .................. 356/394; 250/237 R; 356/384
[58] Field of Search ............... 356/394, 237, 378–379, 356/381, 383–384, 372, 391–393, 388, 397, 432–435; 250/237 R, 560, 562; 313/403; 33/174 B; 364/552, 560–564

[56] References Cited

U.S. PATENT DOCUMENTS 2,532,964 12/1950 Taylor et al. .................. 356/384
2,657,611 11/1953 Borth .................. 356/394
3,906,239 9/1975 Smith et al. .................. 356/237
4,172,553 10/1979 Feather et al. .................. 356/378

OTHER PUBLICATIONS

Ragland, Jr., F. W., "Method of Measuring The Width of Apertures in a PI Shadow Mask", RCA Tech. Notes, TN NO:1231, Mailing Date 9-6-79.

Primary Examiner—William H. Punter
Attorney, Agent, or Firm—James Theodosopoulos

[57] ABSTRACT

A comparator mask for use in apparatus for measuring aperture size of apertured material includes a light transparent section and at least one other section having alternate light transparent and opaque sectors whereby the comparator mask overlays the apertured material to provide an area of light transmission utilized to determine the dimensions of the aperture of the apertured material.

3 Claims, 2 Drawing Figures

COMPARATOR MASK FOR APERTURE MEASURING APPARATUS

TECHNICAL FIELD

This invention relates to apparatus for measuring aperture size of apertured material and more particularly to a comparator mask employed in conjunction with aperture size measuring apparatus.

CROSS REFERENCE TO OTHER APPLICATIONS

This application includes information disclosed but not claimed in a co-pending application entitled "Apparatus and Process For Automatically Measuring Aperture Size of Apertured Material", filed June 9, 1980 in the names of Kenneth French, Robert C. Kocher, Alfred Piorkow, Kenneth Shaner and J. T. Smith, U.S. Ser. No. 158,023.

BACKGROUND ART

As the art of color cathode ray tube manufacture advances, the well-known phosphor-dot screen type of structure is being replaced by the so-called "slotted mask" construction. As is well known, the metallic aperture mask of the phosphor-dot structure included a plurality of substantially round holes. Therein, the diameter of the hole was the critical dimension required to determine the optical transmission characteristics of the holes in the aperture mask. Thus, it was found that relatively simple aperture measuring apparatus employing a light source and light detector was adequate to provide the information necessary to relatively consistent and repetitive manufacture of the aperture masks.

However, the advent of the "slotted mask" structure presented measurement problems which were unknown in the phosphor-dot structure. More specifically, the "slotted mask" structure includes a viewing screen having a plurality of phosphor stripes as compared with phosphor dots. Also, the "slotted mask" structure includes a multiplicity of spaced slots with each slot having multiple dimensions, such as length and width, subject to variation. Since a great number of dimensional combinations provide the same optical transmission capabilities, it becomes necessary to determine the dimensions of the slots if a consistent and repetitive product is to be manufactured.

One known technique for determining the dimensions of the slot of a "slotted mask" structure as disclosed in the previously-mentioned application, utilizes a comparator mask in conjunction with a densitometer. Herein, a comparator mask having alternate opaque and transparent sectors overlays a slotted mask, and is disposed intermediate a light source and a light detector. The comparator mask and slotted mask are positionally located by a programmed computer and optical transmission readings are obtained which may be utilized to calculate the dimensions of the slots of the slotted material.

Although the above-mentioned techniques has been utilized with varying degrees of success, it is well known that the present-day type of "slotted mask" structure may include slots which not only vary in dimensioned size at different positional locations but also vary in spacing between slots at different positional locations. Also, it is common to have "slotted mask" structures wherein the slots tend to be slightly rotated from a vertical axis as the positional location advances from the center toward the outer edges of the structure.

More specifically, slotted masks for cathode ray tubes for example are usually of a rectangular configuration and the slots at the center of the mask are not usually of the same width or length as the slots in the corners of the rectangular-shaped mask. Also, the spacing between the slots at the center of the mask structure and the slots at the corners of the mask structure are known to be different. Moreover, it is not uncommon to have the slots form a series of arcs advancing outwardly from the center of the mask structure and these arcs are formed of slots which are at varying angles of rotation with respect to the horizontal and vertical axis.

As a result, it has been found that a comparator mask with a single section of alternate transparent and opaque sectors is less than adequate in determining measurements in most known "slotted mask" structures. Factually, the variations in slot spacing, slot width and slot rotation at different locations of the "slotted mask" would not permit proper alignment of the single section of alternate transparent and opaque sectors of the comparator mask therwith. As a result, a mismatch between the "slotted mask" and the comparator mask prevented a proper determination of slot size and a proper and consistent product of manufacture. Moreover, the above-mentioned slot, space and rotational variations in the "slotted mask" are deemed desirable which suggests the need for an improved comparator mask if manufacturing capabilities are to be maintained.

DISCLOSURE OF THE INVENTION

In one aspect of the invention a comparator mask for apparatus for automatically measuring aperture size of apertured material includes a light transparent section and multiple sections each having alternate light transparent and opaque sectors with the dimensions of the alternate light transparent and opaque sectors different for each of the multiple sections.

BEST MODE FOR CARRYING OUT THE INVENTION

For a better understanding of the present invention, together with other and further objects, advantages and capabilities thereof, reference is made to the following disclosure and appended claims in conjunction with the accompanying drawings.

Figure 1:
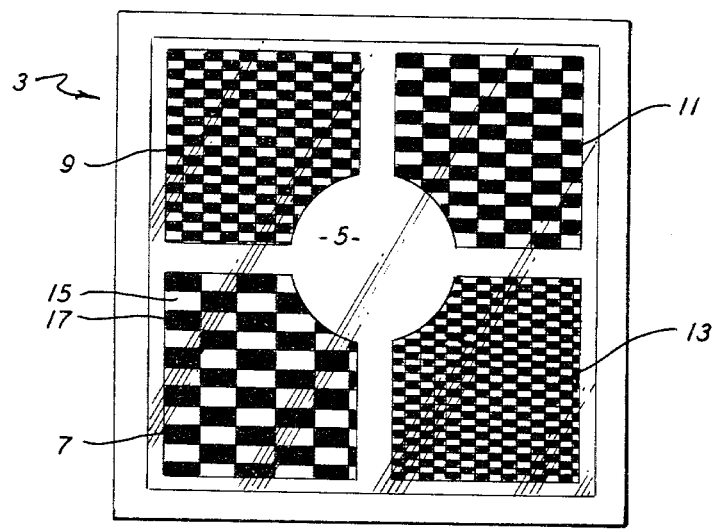
FIG. 1 is a diagrammatic illustration of a preferred embodiment of the invention.

Referring to FIG. 1 of the drawings, a preferred form of comparator mask 3 includes a light transparent section 5 and four sections, 7,9,11 and 13 respectively, of alternate light transparent and opaque sectors 15 and 17. Each of the four sections 7,9,11 and 13 includes alternate light transparent and opaque sectors 15 and 17 which are dimensionally different from the sectors 15 and 17 of the other sections. Since the positional locations whereat measurements are to be taken are preselected and the horizontal slot spacing and rotational characteristic at the particular location are also known, the particular one of the four sections 7,9,11 and 13 which most closely resembles the apertured material at a particular preselected location is utilized to enable a preferred alignment of aperture mask and comparator mask.

As to utilization of the above-described comparator mask 3, it has previously been mentioned that a copending application entitled "Apparatus and Process for Automatically Measuring Aperture Size Of Apertured Material" provides and discusses in detail apparatus suitable for use with the presently presented comparator mask 3. This co-pending disclosure is incorporated herein by reference and includes a modified densitometer having an aligned light source and light detector providing a light beam. A first x-y translator stage supports and transports a "slotted mask" structure while a second x-y translator stage supports and transports the above-described comparator mask. Moreover, the comparator mask and "slotted mask" are spaced apart in overlaying relationship intermediate the light source and light detector.

A computer is coupled to and controls the positional locations of the first and second x-y translation stages in accordance with preselected areas of measurement of the "slotted mask". Since the slot dimensions, spacings, and rotational characteristic at the selected areas of measurement have been chosen and are known, the computer is programmed to select the particular section 7,9,11 or 13 of the comparator mask 3 which most closely corresponds to the "slotted mask" structure at the selected areas of measurement. Moreover, the computer is programmed to effect alignment of the slots of the "slotted mask" and the transparent and opaque sectors 15 and 17 of the comparator mask 3 to provide maximum optical transmission therethrough.

Figure 2:
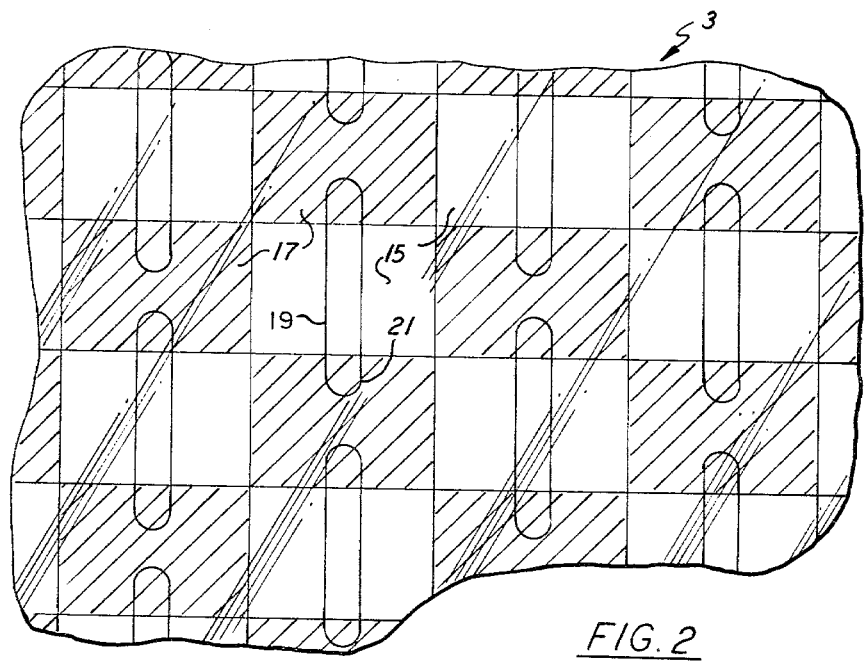
FIG. 2 illustrates the utilization of the embodiment of FIG. 1 in an aperture size measuring apparatus.

Referring to FIG. 2 of the drawings, it is known that the slots 19 of a "slotted mask" tend to have end portions 21 which are of a substantially rounded configuration. Also, it is known that measurements of such rounded end portions 21 tend to be more erratic and inconsistent than measurements made on substantially rectangular-shaped areas. Thus, a section of the comparator mask 3 is selected whereat the rounded ends 21 of the slot 19 are overlayed by the opaque sectors 17 while the remainder of the slot 19 is substantially centered in the transparent sector 15 of the comparator mask 3.

In this manner, the area of optical transmission for the combined "slotted masks" and overlaying comparator mask 3 is essentially a rectangle configuration. Moreover, one dimension of the rectangle configuration is known since the dimensions of the transparent and opaque sectors 15 and 17 are known. Thus, the known one dimension of the rectangular area combined with the known optical transmission capability of the rectangular area permits one to calculate the remaining dimension or width of the slot 19 of the apertured material. As a result, a consistent size slot and reliable product of manufacture is provided.

Additionally, it is to be noted that the variations in horizontal spacing and rotation of the slots at the various measurement locations of the "slotted mask" would present a mismatch for any one section of a comparator mask 3 if the comparator mask 3 is limited to a single dimensional entity. In such cases, the number of measurement slots is limited and the average thereof also is limited. Moreover, alignment of this limited number of slots and the transparent and opaque sectors of the comparator mask 3 would be most difficult and critical. However, the availability of multiple sections of differing dimensions and rotation provides a matching capability of the "slotted mask" and the comparator mask 3 which was previously unattainable.

While there has been shown and described what is at present considered the preferred embodiment of the invention, it will be obvious to those skilled in the art that various changes and modifications may be made therein without departing from the invention as defined by the appended claims.

INDUSTRIAL APPLICABILITY

There has been provided a unique comparator mask suitable for use with apparatus and a process for automatically measuring the aperture size of an apertured material. The comparator mask is particularly appropriate to apertured material wherein the apertures are in the form of slots, raher than holes, and apertured material wherein the slots vary in dimensional spacing and rotation along a horizontal axis.

More specifically, the comparator mask is especially suitable for utilization with apparatus for measuring the dimensions of the slots in a slotted mask employed in color cathode ray tube manufacture. The multiple dimensional and rotational capabilities of the comparator mask provide enhanced flexibility for measuring exotic and unknown aperture mask designs and provide a precision of measurement believed to be previously unavailable.

We claim:

1. In apparatus for determining aperture size of slotted apertured material for a color cathode ray tube wherein a comparator mask is employed in conjunction with the apertured material intermediate a light source and light detector to provide optical transmission data, the improvement comprising a comparator mask having a light transparent section and multiple sections of alternate transparent and opaque sectors with each of said sectors having a length less than the length measured along the longitudinal axis of a slot of said slotted apertured material, wherein each of said multiple sections has alternate transparent and opaque sectors of a size different from the alternate transparent and opaque sectors of another section.

2. The improvement of claim 1 wherein said comparator mask includes said light transparent section and four sections each having alternate transparent and opaque sectors with said transparent and opaque sectors of each of said sections differing dimensionally.

3. A comparator mask for use in apparatus for measuring the aperture size of a color cathode ray tube slotted apertured material comprising:

a light transparent section and four sections of alternate transparent and opaque sectors with each sector having a dimension less than the length along a longitudinal axis of a slot of said slotted apertured material and said alternate transparent and opaque sectors of each of said four sections differing dimensionally from each other.

* * * * *

UNITED STATES PATENT AND TRADEMARK OFFICE
CERTIFICATE OF CORRECTION

PATENT NO. : 4,349,278
DATED : Sept. 14, 1982
INVENTOR(S) : Kenneth French et al.

It is certified that error appears in the above-identified patent and that said Letters Patent is hereby corrected as shown below:

On the title page, assignee should read:

-- GTE Laboratories Inc. ---

Signed and Sealed this

Twenty-ninth Day of March 1983

[SEAL]

Attest:

GERALD J. MOSSINGHOFF

Attesting Officer

Commissioner of Patents and Trademarks